(12) United States Patent
Chandrasekhar

(10) Patent No.: US 9,692,759 B1
(45) Date of Patent: Jun. 27, 2017

(54) CONTROL OF CLOUD APPLICATION ACCESS FOR ENTERPRISE CUSTOMERS

(71) Applicant: Trend Micro Incorporated, Tokyo (JP)

(72) Inventor: Bharath Kumar Chandrasekhar, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 512 days.

(21) Appl. No.: 14/252,557

(22) Filed: Apr. 14, 2014

(51) Int. Cl.
*H04L 29/06* (2006.01)

(52) U.S. Cl.
CPC .......... *H04L 63/10* (2013.01); *H04L 63/0428* (2013.01)

(58) Field of Classification Search
CPC ............................ H04L 63/10; H04L 63/0428
See application file for complete search history.

(56) References Cited

U.S. PATENT DOCUMENTS

| | | | |
|---|---|---|---|
| 6,151,676 A | 11/2000 | Cuccia et al. | |
| 6,567,914 B1 | 5/2003 | Just et al. | |
| 6,574,733 B1 | 6/2003 | Langford | |
| 6,675,296 B1 | 1/2004 | Boeyen et al. | |
| 6,760,752 B1 | 7/2004 | Liu et al. | |
| 6,807,277 B1 | 10/2004 | Doonan et al. | |
| 6,912,655 B1 | 6/2005 | Zucker | |
| 7,234,059 B1 | 6/2007 | Beaver et al. | |
| 7,257,706 B1 | 8/2007 | Zucker | |
| 7,260,724 B1 | 8/2007 | Dickinson et al. | |
| 7,263,619 B1 | 8/2007 | Kim | |
| 7,480,384 B2 | 1/2009 | Peyravian et al. | |
| 8,271,788 B2 | 9/2012 | Dancer et al. | |
| 8,321,669 B2 | 11/2012 | Dancer | |
| 8,649,522 B2 | 2/2014 | Dancer et al. | |
| 8,856,300 B2 * | 10/2014 | de los Reyes et al. | 709/223 |
| 8,973,088 B1 * | 3/2015 | Leung | H04L 63/00 726/1 |
| 9,495,188 B1 * | 11/2016 | Ettema | G06F 9/45533 |
| 2002/0016927 A1 | 2/2002 | Nagata et al. | |
| 2003/0037241 A1 | 2/2003 | Campagna | |
| 2003/0161335 A1 | 8/2003 | Fransdonk | |
| 2003/0179885 A1 | 9/2003 | Gentry et al. | |

(Continued)

OTHER PUBLICATIONS

Sebastian Zander, et al. "Automated Traffic Classification and Application Identification using Machine Learning", 2005, 8 sheets, Proceedings of the IEEE Conference on Local Computer Networks 30th Anniversary (LCN'05).

(Continued)

*Primary Examiner* — Jeffrey Pwu
*Assistant Examiner* — William Corum, Jr.
(74) *Attorney, Agent, or Firm* — Okamoto & Benedicto LLP

(57) ABSTRACT

A system for controlling access to cloud applications includes a cloud security server that receives network traffic stream from cloud application clients of a private computer network. The cloud security server examines the network traffic stream to identify a cloud application that is associated with the network traffic stream and directs the network traffic stream to one of several application handlers that is configured to process network traffic stream for the cloud application. The application handler enforces on the network traffic stream an application policy that is applicable to the cloud application.

8 Claims, 5 Drawing Sheets

(56) References Cited

U.S. PATENT DOCUMENTS

| | | |
|---|---|---|
| 2005/0198170 A1 | 9/2005 | LeMay et al. |
| 2007/0055731 A1 | 3/2007 | Thibeault |
| 2007/0174636 A1 | 7/2007 | Raja |
| 2009/0198997 A1 | 8/2009 | Yeap et al. |
| 2010/0161956 A1 | 6/2010 | Rasheed et al. |
| 2010/0212010 A1* | 8/2010 | Stringer et al. ............ 726/22 |
| 2012/0079585 A1 | 3/2012 | Chan et al. |
| 2013/0305376 A1* | 11/2013 | Chauhan ............ G06F 21/577 726/25 |
| 2013/0311777 A1 | 11/2013 | Kolar Sundar et al. |
| 2014/0053280 A1* | 2/2014 | Durazzo et al. ............ 726/28 |
| 2014/0090059 A1* | 3/2014 | Wang ............ H04L 63/1416 726/23 |
| 2014/0181290 A1* | 6/2014 | Wong ............ 709/224 |
| 2014/0282821 A1* | 9/2014 | Adler et al. ............ 726/1 |
| 2014/0295821 A1* | 10/2014 | Qureshi ............ 455/419 |
| 2014/0337528 A1* | 11/2014 | Barton et al. ............ 709/225 |
| 2014/0373104 A1* | 12/2014 | Gaddam et al. ............ 726/4 |
| 2015/0016249 A1* | 1/2015 | Mukundan ............ H04L 47/125 370/230 |
| 2015/0026756 A1* | 1/2015 | Reddy ............ H04W 12/08 726/1 |
| 2016/0381065 A1* | 12/2016 | Xie ............ G06F 21/56 726/23 |

OTHER PUBLICATIONS

Myung-Sup Kim, et al."Application-Level Traffic Monitoring and an Analysis on IP Networks", Feb. 2005, pp. 1-22, ETRI Journal, vol. 27, No. 1.

Skyhigh—Discover and Analyze, 2 sheets, webpage [online][retrieved on Jan. 21, 2014], retrieved from the internet: www.skyhighnetworks.com.

Skyhigh—Secure, 2 sheets, webpage [online][retrieved on Jan. 21, 2014], retrieved from the internet: www.skyhighnetworks.com.

App-ID: Identifying Any Application on Any Port, 1 sheet [retrieved on Apr. 1, 2014], retrieved from the internet: https://www.paloaltonetworks.com/products/technologies/app-id.html.

Palo Alto Networks: App-ID Technology Brief, 5 sheets [retrieved on Apr. 1, 2014], retrieved from the internet: https://paloaltonetworks.com/resources/techbriefs/app-id-tech-brief.html.

* cited by examiner

CONTROL OF CLOUD APPLICATION ACCESS FOR ENTERPRISE CUSTOMERS

BACKGROUND OF THE INVENTION

1. Field of the Invention

The present invention relates generally to computer security, and more particularly but not exclusively to methods and systems for controlling access to cloud applications.

2. Description of the Background Art

"Cloud applications" are remotely provided computer services that are accessible over a public computer network, such as the Internet. Cloud applications are provided by a third party referred to as a "cloud application provider." The cloud applications are hosted by a cloud application server, which comprises one or more server computers with server software. Those who subscribe to use the cloud applications, who are also referred to as "customers," remotely access a cloud application using a cloud application client. A cloud application client may be a client computer with client software. The client software may be general purpose (e.g., a web browser) or tailored specifically to work with a particular cloud application.

"Enterprise customers" are users of cloud applications who belong to an entity, such as a corporation, government, or other group of users. The popularity of cloud applications raises many issues for an enterprise because it is relatively difficult to monitor and control access to third party services, such as cloud applications. Given the large number of cloud applications available, it is very difficult to protect an enterprise network from data leakage, virus-infection, and other computer security-related issues that may be brought about by accessing cloud applications.

SUMMARY

In one embodiment, a system for controlling access to cloud applications includes a cloud security server that receives network traffic stream from cloud application clients of a private computer network. The cloud security server examines the network traffic stream to identify a cloud application that is associated with the network traffic stream and directs the network traffic stream to one of several application handlers that is configured to process network traffic stream for the cloud application. The application handler enforces on the network traffic stream an application policy that is applicable to the cloud application.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
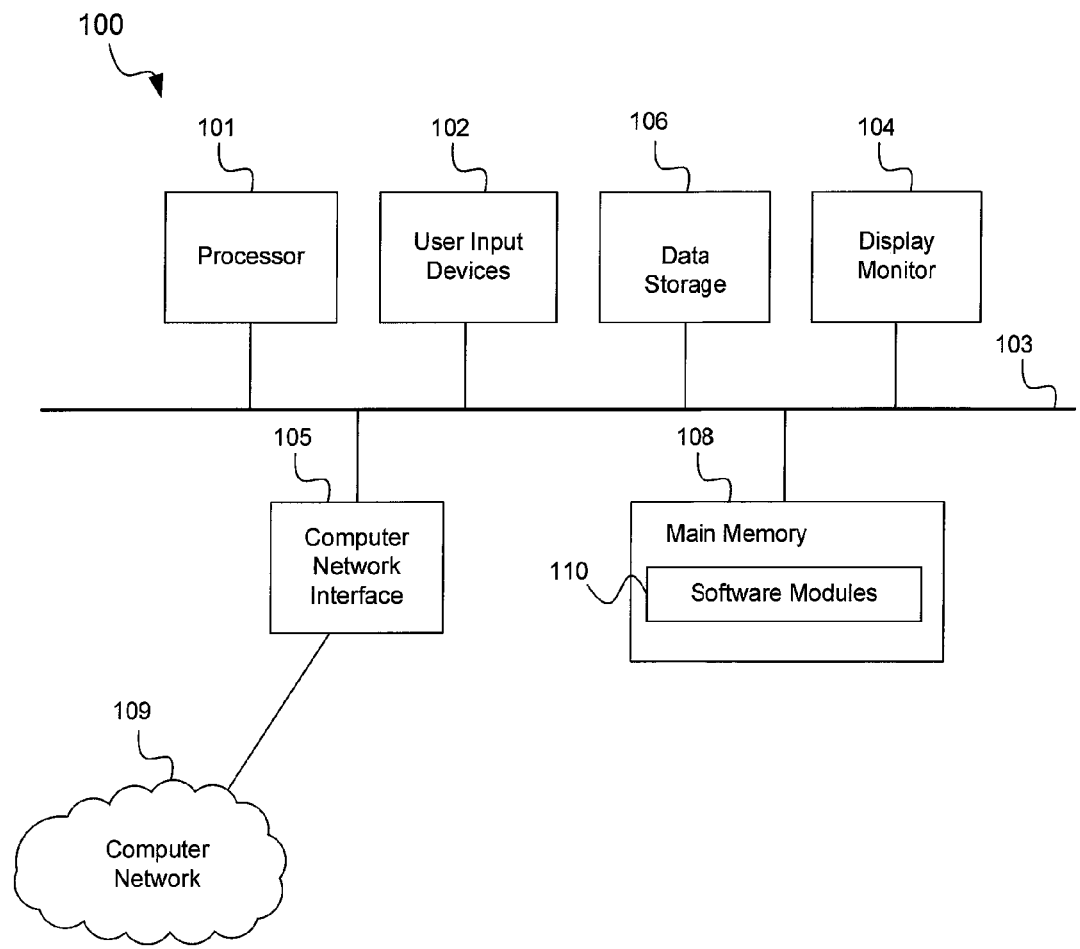
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as a cloud application client, server, controller, and other computers described below. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise an application identification module, an application handler, a data encryption module, and a classification database when the computer 100 is employed as a cloud security server.

The computer 100 may be configured to perform its functions by executing the software modules 110. The software modules 110 may be loaded from the data storage device 106 to the main memory 108. An article of manufacture may be embodied as computer-readable storage medium including instructions that when executed by the computer 100 causes the computer 100 to be operable to perform the functions of the software modules 110.

Figure 2:
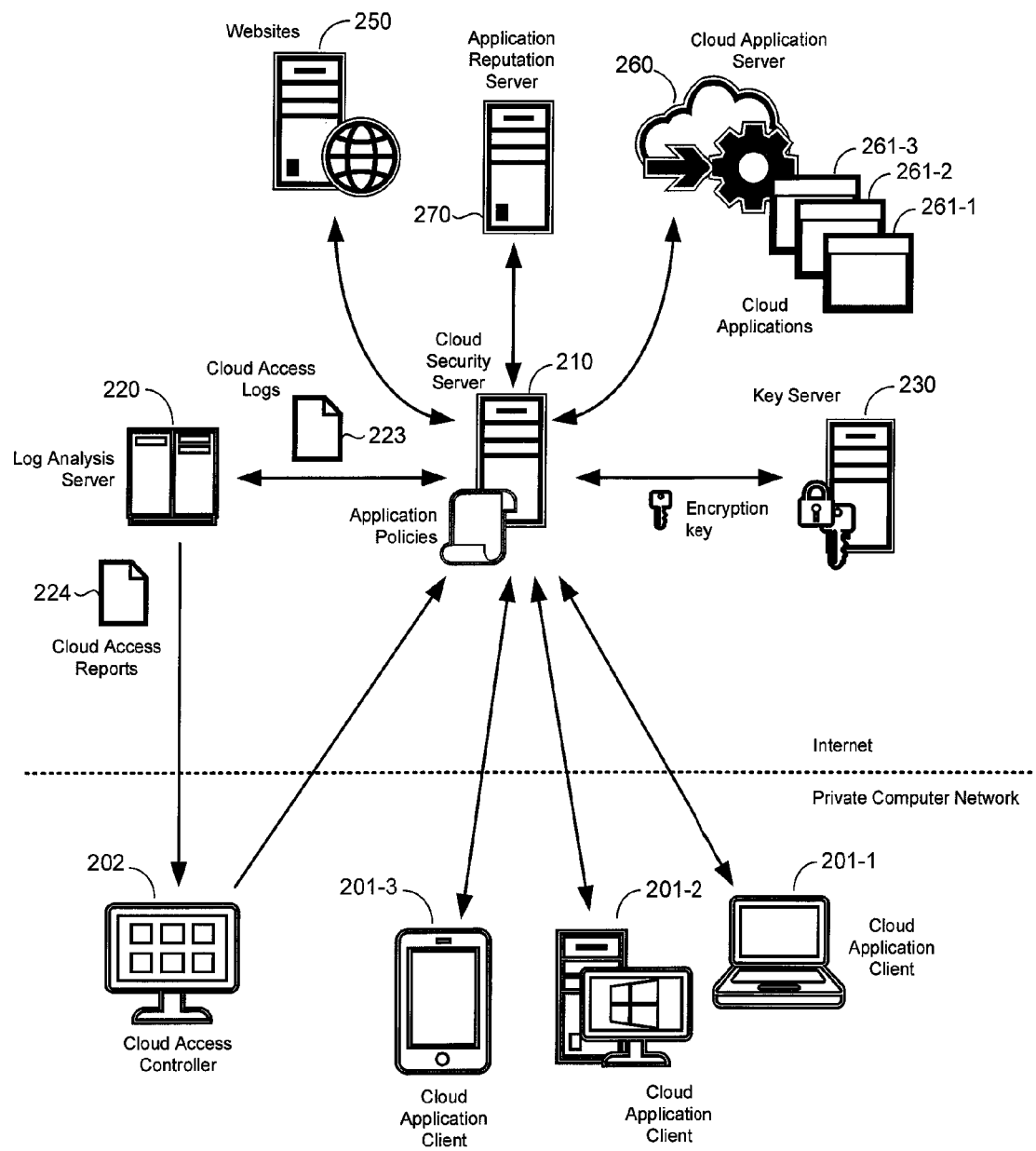
FIG. 2 shows a schematic diagram of a system for controlling access to cloud applications in accordance with an embodiment of the present invention.

FIG. 2 shows a schematic diagram of a system for controlling access to cloud applications in accordance with an embodiment of the present invention. In the example of FIG. 2, the system includes a plurality of cloud application clients 201 (i.e., 201-1, 201-2, 201-3, etc.), a cloud access controller 202, a cloud security server 210, a log analysis server 220, a key server 230, websites 250, a cloud application server 260, and an application reputation server 270. The plurality of cloud application clients 201 and the cloud access controller 202 may belong to a private computer network, such as an enterprise computer network of a corporation or government, for example. The other components of the system may be accessible over a public computer network, which in this example is the Internet. In general, the components of the system may communicate over a computer network, such as over the private computer network and/or the Internet. Furthermore, a server component of the system may comprise a server computer and associated server software. A server computer may comprise a single computer or one or more interconnected (e.g., by bus or network) computers.

A cloud application client 201 may comprise a client computer and associated client software for accessing a cloud application 261 hosted by the cloud application server 260. Only one cloud application server 260 is depicted in FIG. 2 for clarity of illustration; in practice, the cloud applications 261 may be on separate servers. A cloud application client 201 may be associated with a particular user (e.g., by Internet protocol (IP) address). A cloud application client 201 may be a mobile computing device (e.g., iPhone™ smartphone, an ANDROID smartphone, an iPad™ tablet, an ANDROID tablet) running a mobile operating system (e.g., IOS™ mobile operating system, ANDROID operating system) or other user computer (e.g., a laptop, a desktop) with suitable software. A cloud application client 201 may include a dedicated client software (i.e., designed exclusively for the cloud application 261) or general purpose client software (e.g., a web browser) for accessing a cloud application 261. The user may sign on a cloud application 261 with a user ID (identification) or some other credential. From a network traffic stream, the user may be identified as accessing a cloud application 261 by his user ID or identifier of the cloud application client 201 (e.g., IP or Media Access Control (MAC) address of the client computer).

The cloud application server 260 may comprise a server computer and associated server software for hosting one or more cloud applications 261 (i.e., 261-1, 261-2, 261-3, etc.). A cloud application 261 may be for productivity (e.g., word processing, spreadsheet), education (e.g., learning a language), refreshment, sports, porn, or other categories of cloud applications. The cloud application server 260 is "in-the-cloud" in that it is off-premises (i.e., outside a private computer network) and is accessible over the Internet. The cloud application server 260 may be part of a commercially-available cloud computing platform, such as the Amazon Web Services™ cloud computing platform, for example.

The cloud security server 210 may comprise a server computer and associated server software for controlling access to cloud applications. The cloud security server 210 may receive network traffic that is streamed between a cloud application client 201 and a cloud application 261 by proxy, routing, or other ways of directing network traffic.

In one embodiment, the cloud security server 210 receives network traffic between a cloud application client 201 and a cloud application 261, identifies the cloud application 261 associated with the network traffic (e.g., source or destination of the network traffic), identifies an application handler in a plurality of application handler, forwards the network traffic to the application handler that is configured to process network traffic of the cloud application 261, and generates a cloud access log 223 of the network traffic. As its name implies, the cloud access log 223 contains information regarding the cloud application client's 221 access of the cloud application 261. The cloud security server 210 may forward the cloud access log 223 to a log analysis server 220 for data analysis. The log analysis server 220 may be employed to generate a cloud access report by aggregating information from a plurality of cloud access logs 223.

The cloud security server 210 may consult an application reputation server 270 to determine a reputation of a cloud application 261. The application reputation server 270 may comprise a conventional application reputation server comprising a server computer with associated server software that maintains a database of reputations of known cloud applications 261, such as whether a cloud application 261 is malicious (e.g., comprises malicious code), legitimate (i.e., non-malicious/normal), or has an unknown reputation. The cloud security server 210 may comprise that of the Trend Micro™ mobile app reputation service, for example.

The cloud security server 210 may perform encryption/decryption of data to be sent to or received from a cloud application 261 depending on a policy that is applicable to the cloud application 261. For example, an application policy may indicate that data transmitted from a cloud application client 201 to the cloud application 261 is to be encrypted before the data is provided to the cloud application 261. Similarly, the application policy may dictate decrypting encrypted data received from the cloud application 261 before the encrypted data is provided to the cloud application client 201. The cloud security server 210 may encrypt and decrypt data using an encryption key that is remotely stored in a key server 230, which may comprise a server computer and associated server software for generating, storing, and/or providing encryption keys.

In one embodiment, the cloud security server 210 is implemented as a proxy server that receives all network traffic between cloud application clients 201 and computers on the Internet. In that embodiment, the cloud security server 210 receives not only network traffic between the cloud application server 260 and the cloud application clients 201, but also network traffic between regular websites 250 and the cloud application clients 201. In general, a website 250 comprises a server computer and associated server software for hosting a website.

The log analysis server 220 comprises a server computer and associated server software for receiving access logs 223 from the cloud security server 210 and generating cloud access reports 224 based on the access logs 223. The log analysis server 220 may include parsing, data analysis, and reporting modules for generating cloud access reports 224. For example, the log analysis server 220 may generate a cloud access report 224 that includes information on which cloud application client 201 accesses which cloud application 261, access frequency (dates, time, duration), particulars of the access (e.g., storage or retrieval of data, the data involved), and other cloud application access-related information. A cloud access report 224 may be generated by aggregating information from a plurality of cloud access logs 223.

The cloud access controller 202 may comprise a computer and associated software for receiving cloud access reports 224 from the log analysis server 220. An administrator of the private computer network may employ the cloud access controller 202 to receive a cloud access report 224 and review the cloud access report 224 to create application policies for particular cloud applications 261. For example, the administrator may indicate in an application policy which cloud application client 201 or associated user can access which cloud application 261, the type of data that may be forwarded to the cloud application 261 (e.g., a restriction on transfer of corporate data), whether data to be transmitted to the cloud application 261 is to be encrypted, whether to block or allow access to the cloud application 261, and so on. Application policies may be forwarded from the cloud access controller 202 to the cloud security server 210. The administrator may also use the cloud access controller 202 to sign into the cloud security server 210 and enter the application policies directly, e.g., by way of a user interface served by the cloud security server 210.

Figure 3:
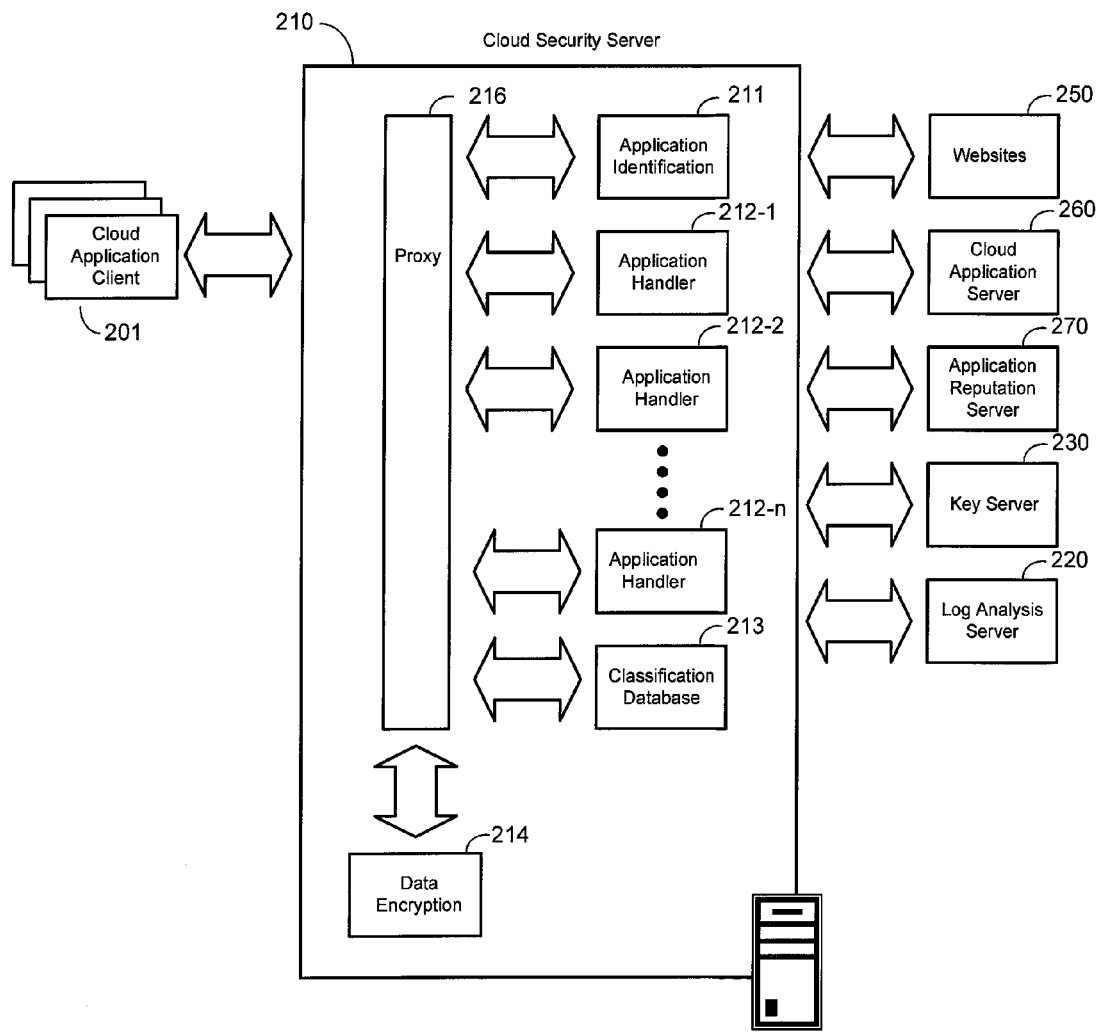
FIG. 3 shows a schematic diagram of a cloud security server in accordance with an embodiment of the present invention.

FIG. 3 shows a schematic diagram of a cloud security server 210 in accordance with an embodiment of the present invention. FIG. 3 also shows the previously described cloud application clients 201, websites 250, cloud application server 260, application reputation server 270, key server 230, and log analysis server 220.

In the example of FIG. 3, the cloud security server 210 comprises a proxy module 216, an application identification module 211, a plurality of application handlers 212 (i.e., 212-1, 212-2, . . . , 212-n), a classification database 213, and a data encryption module 214. In one embodiment, the just-mentioned components of the cloud security server 210 are implemented in software. As can be appreciated, these components may also be implemented in hardware or combination of hardware and software without detracting from the merits of the present invention.

In one embodiment, the proxy module 216 comprises proxy server software for hypertext transfer protocol (HTTP) and/or hypertext transfer protocol secure (HTTPS). The proxy module 216 receives network traffic over the Internet (e.g., by listening on port 80 and 443) and forwards the network traffic to the appropriate component of the cloud security server 210. For example, the proxy module 216 may receive network traffic from a cloud application client 201, websites 250, and/or the cloud application server 260 and forward the received network traffic to the application identification module 211. The proxy module 216 may also receive processed network traffic from a component of the cloud security server 210 and forward the processed network traffic to a destination on the Internet. For example, the proxy module 216 may receive processed network traffic from an application handler 212 and forward the processed network traffic to the cloud application client 201, a website 250, or the cloud application server 260 depending on the intended destination of the network traffic.

In one embodiment, the classification database 213 is a local database of categories of cloud applications. The records of the classification database 213 may be populated by receiving cloud application category data from a remotely located server or by direct manual input by the administrator using the cloud access controller 202 (see FIG. 2), for example. The classification database 213 may indicate whether a cloud application 261 belongs to productivity (e.g., a word processing, spreadsheet), game, social network, sports, or other categories of cloud applications.

The encryption module 214 may comprise software for encrypting and decrypting data of network traffic (e.g., from payloads). For example, the encryption module 214 may encrypt plaintext (i.e., in the clear) data into encrypted data and decrypt encrypted data back into plaintext data. The encryption module 214 may communicate with the key server 230 to store or retrieve encryption keys for encryption and decryption. The encryption module 214 may employ conventional encryption algorithms (e.g., symmetric-key or asymmetric-key cryptography).

The application identification module 211 may comprise software for identifying the cloud application 261 associated with network traffic. That is, the application identification module 211 may identify the particular cloud application 261 that is involved in the network traffic, e.g., the cloud application 261 that is sending or receiving the data included in the network traffic.

For example, the proxy module 210 may forward received network traffic to the application identification module 211. The application identification module 211 may then analyze packets of the network traffic to identify the cloud application 261 that is sending or receiving data included in the network traffic. Generally speaking, application identification algorithms are well known and implemented by several security vendors, including Palo Alto Networks™ and BroadWeb™, for example. The application identification module 211 may employ conventional application identification algorithms without detracting from the merits of the present invention.

An application handler 212 may comprise software for controlling access to a particular cloud application 261. In the example of FIG. 3, the cloud security server 210 includes a plurality of application handlers 212, with one application handler 212 being designated to process network traffic of one particular cloud application 261. In one embodiment, a single application handler 212 is designated to process network traffic to and from a single cloud application 261. For example, an application handler 212-1 may be designated to process network traffic of a cloud application 261-1 (see FIG. 2), an application handler 212-2 may be designated to process network traffic of a cloud application 261-2, etc. An application handler 212 may enforce policies on the network traffic and generate a cloud access log 223 (see FIG. 2) based on the network traffic.

As an example operation, the proxy module 216 may receive network traffic that arrives on either port 80 (for HTTP traffic) or port 443 (for HTTPS traffic). The proxy module 216 may forward the received network traffic to the application identification module 211, which identifies the cloud application 261 that is associated with the received network traffic. The application identification module 211 may consult a local listing of cloud applications 261 and their corresponding application handlers 212. The application identification module 211 forwards the received network traffic to the designated application handler 212 for the identified cloud application 261. The designated application handler 212 for the identified cloud application 261 parses the network traffic to understand the application flow and identify messages, fields, and other data that are related to the identified cloud application 261, enforces one or more application policies on the network traffic, and generates a cloud access log 223 for the network traffic. The designated application handler 212 may forward the network traffic back to the proxy module 216 for transmission to its destination when the application policies allow. The designated application handler 212 may also initiate blocking of the network traffic when an application policy so indicates.

Figure 4:
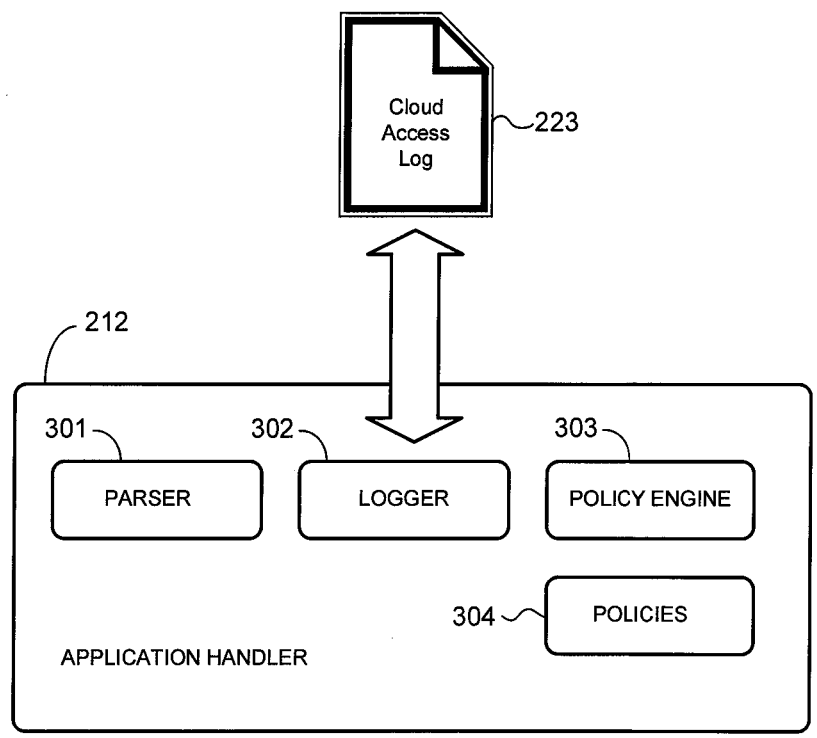
FIG. 4 shows a schematic diagram of a an application handler in accordance with an embodiment of the present invention.

FIG. 4 shows a schematic diagram of a an application handler 212 in accordance with an embodiment of the present invention. In the example of FIG. 4, the application handler 212 comprises a parser 301, a logger 302, a policy engine 303, and application policies 304. In one embodiment, the parser 301 is configured to receive and parse received network traffic to retrieve messages, fields, and other data related to the cloud application 261. The policy engine 303 may be configured to work with the parser 301 to determine what the cloud application 261 is doing, such as whether the cloud application 261 is transmitting data to a cloud application client 201, storing data received from the cloud application client 201, accessing data that are stored in the cloud, or performing other actions. The parser 301 and the policy engine 303 may be configured to understand network traffic of the cloud application 261.

The policy engine 303 may consult the application reputation server 270 to determine the reputation of the cloud application 261. The policy engine 303 may periodically consult the application reputation server 270 even when the cloud application 261 is supposed to have a good reputation because the cloud application 261 may be infected or compromised in-between reputation checks. The policy engine 303 may also consult the classification database 213 to determine the category of the cloud application 261. The policy engine 203 may periodically check the category of the cloud application 261 in case its category changes over time.

The policy engine 303 may consult the application policies 304 to determine the security-related policies that apply to the cloud application 261. For example, the application policies 304 may dictate the users (e.g., as identified by the cloud application client 201 employed) that are authorized to access the cloud application 261, the data that can be sent to or received from the cloud application 261, controlling access of the cloud application 261 based on the category or reputation of the cloud application 261, whether or not data involving the cloud application 261 are to be encrypted, and so on. The policy engine 303 may enforce the application policies 304. For example, when an application policy 304 dictates that access to a pornography cloud application is prohibited and the cloud application 261 belongs to the pornography category, the policy engine 303 may block network traffic to and from the cloud application 261.

The logger 302 may create a cloud access log 223 that indicates the activities of the cloud application 261 including the user that is currently using the cloud application 261. For example, the cloud access log 223 may have the following format:

{application-identified}-{timestamp}-{user-id}-{data fields accessed}-{action} where "{application-identified}" identifies the cloud application 261 involved in the network traffic, "{timestamp}" is a time stamp on when the log entry was created, "{user-id}" identifies the user accessing the cloud application 261, "{data fields accessed}" indicate the data accessed from and sent to the cloud application 261, and "{action}" indicates what the cloud application 261 is doing. The cloud access log 223 may also have other formats or entries. The logger 302 may periodically send a cloud access log 223 to the log analysis server 220.

Figure 5:
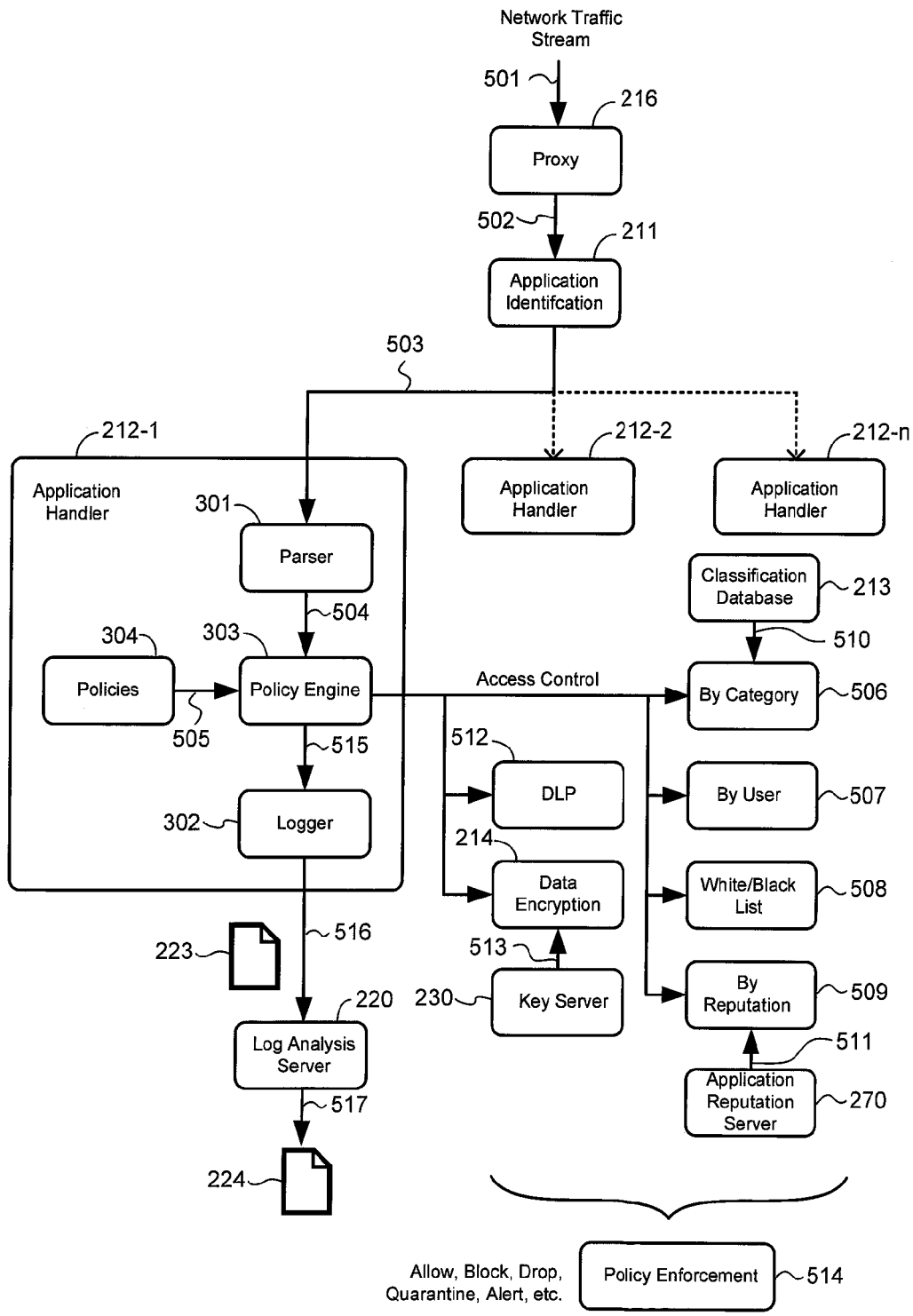
FIG. 5 shows a flow diagram of a computer-implemented method of controlling access to cloud applications in accordance with an embodiment of the present invention.

FIG. 5 shows a flow diagram of a computer-implemented method of controlling access to cloud applications in accordance with an embodiment of the present invention. The method of FIG. 5 is explained using previously described components for illustration purposes only. Other components may also be used without detracting from the merits of the present invention.

In the example of FIG. 5, network traffic arrives at the cloud security server 210 (see arrow 501). There, the network traffic is received by the proxy module 216, which then forwards the network traffic to the application identification module 211 (see arrow 502). The application identification module 211 analyzes the network traffic to identify the cloud application 261 that is associated with the network traffic. After identifying the cloud application 261, the application identification module 211 forwards the network traffic to an application handler 212 that is configured to process network traffic associated with the cloud application 261 (see arrow 503). In the example of FIG. 5, the application handler 212-1 is configured to process the network traffic of the cloud application 261. The other application handlers 212 may be configured to process network traffic of other cloud applications 261.

In the application handler 212-1, a parser 301 parses the network traffic to retrieve messages, fields, and other data for analyzing the network traffic of the cloud application 261. The parser 301 provides the retrieved data to the policy engine 303 (see arrow 504), which evaluates the retrieved data to determine what the cloud application 261 is doing and to obtain other information regarding the cloud application 261.

The policy engine 303 may consult the application policies 304 to find application policies that are applicable to the cloud application 261 (see arrow 505). For example, one or more application policies 304 may instruct the policy engine 303 to control access to the cloud application 261 by category (see block 506), by user (see block 507), in accordance with a whitelist/blacklist (see block 508), or by reputation (see block 509).

An application policy 304 may restrict access to certain categories of cloud applications 261. In that example, the policy engine 303 may consult the classification database 213 to determine the category of the cloud application 261 (see arrow 510). Another application policy 304 may dictate blocking access to cloud applications 261 that have a bad reputation. In that example, the policy engine 303 may consult the application reputation server 270 to obtain the reputation of the cloud application 261 (see arrow 511). The policy engine 303 may obtain the user's identification and the domain name or Internet protocol (IP) address of the server hosting the cloud application 261 to apply application policies 304 that govern users (e.g., which user can access which cloud application 261), servers or cloud applications 261 that are always blocked (e.g., in a black list), and servers or cloud applications 261 that are known good (e.g., in a whitelist).

An application policy 304 may indicate restriction on data transfer involving certain data, such as confidential corporate data. In that example, the policy engine 303 may consult a remotely located data leakage prevention (DLP) system 512 to determine whether the network traffic involving the cloud application 261 involves data transfer of confidential corporate data. Yet another application policy 304 may indicate encryption/decryption of data involving particular cloud applications 261. In that example, the policy engine 303 may work with the data encryption module 214 to receive an encryption key from the key server 230 (see arrow 513) and encrypt/decrypt the data.

The policy engine 303 may enforce one or more application policies 304 that govern access to the cloud application 261 (see block 514). For example, the policy engine 303 may block network traffic, quarantine network traffic, allow network traffic, send an alert to an administrator, encrypt data of the network traffic, etc. as per the applicable application policies 304.

Data retrieved by the parser 301 from the network traffic and results of evaluations performed by the policy engine 303 may be provided to the logger 302 (see arrow 515), which generates a cloud access log 223 for the network traffic involving the cloud application 261. The logger 302 provides the cloud access log 223 to the log analysis server 220 for analysis (see arrow 516). The log analysis server 220 may generate a cloud access report 224 based on the cloud access log 223 (see arrow 517). For example, the log analysis server 220 may aggregate information from several cloud access logs 223 to generate a cloud access report 224. As a particular example, the cloud access report 224 may indicate access frequencies (dates, time, duration), which cloud application client 201 accesses which cloud application 261, particulars of the access (e.g., storage or retrieval of data, the data involved), and other cloud application access-related information. An administrator of the private computer network may receive and review the cloud access report 224 to create application policies 304 that are applicable particular cloud applications 261.

Techniques for controlling access to cloud applications have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of controlling access to cloud applications, the method comprising:
   receiving network traffic between a cloud application client and a cloud application being accessed by the cloud application client;
   examining the network traffic to identify the cloud application;
   identifying an application handler in a plurality of application handlers for processing the network traffic involving the cloud application hosted by a particular server computer, each application handler in the plurality of application handlers being configured to process network traffic of a particular cloud application in a plurality of cloud applications to identify and log access to a corresponding cloud application, each of the plurality of cloud applications being hosted by a corresponding particular server computer;
   forwarding the network traffic to the application handler; and
   enforcing on the network traffic an application policy in a plurality of application policies;
   generating a cloud access log that indicates the network traffic;
   forwarding the cloud access log to a log analysis server over the Internet; and
   generating a cloud access report based on the cloud access log,
   (a) wherein a first application policy in the plurality of application policies indicates blocking cloud applications that belong to a category of cloud applications, and wherein enforcing the application policy comprises determining a category of the cloud application and blocking the network traffic in response to determining that the cloud application belongs to the category of cloud applications,
   (b) wherein a second application policy in the plurality of application policies indicates which user can access which cloud application in the plurality of cloud applications, and wherein enforcing the application policy comprises determining a user of the cloud application client and blocking the network traffic in response to determining that the user is not authorized to access the cloud application, and
   (c) wherein a server that is hosting the cloud application is in a blacklist, and wherein enforcing the application policy comprises blocking the network traffic in accordance with the blacklist.

2. The method of claim 1, wherein enforcing the application policy comprises encrypting data to be provided to the cloud application.

3. The method of claim 2, further comprising:
   receiving an encryption key from a remote key server; and
   using the encryption key to encrypt the data to be provided to the cloud application.

4. The method of claim 1, further comprising:
   retrieving data from the network traffic;
   determining that the data comprise protected corporate data; and
   blocking the network traffic in response to determining that the data comprise protected corporate data.

5. A system for controlling access to cloud applications, the system comprising:
   a cloud application server hosting a first cloud application;
   a plurality of cloud application clients of a private computer network; and
   a cloud security server that receives over the Internet a network traffic stream from a first cloud application client in the plurality of cloud application clients, identifies the first cloud application in a plurality of cloud applications as being associated with the network traffic stream, directs the network traffic stream to a first application handler in a plurality of application handlers that is configured to identify and log access to the first cloud application hosted by the cloud application server, enforces on the network traffic stream an application policy rule in a plurality of application policy rules that is applicable to the first cloud application, and forwards the network traffic stream to the first cloud application when the application policy rule does not prohibit forwarding of the network stream to the first cloud application, generates a cloud access boa that indicates the network traffic stream, forwards the cloud access log to a log analysis server over the Internet, and generates a cloud access report based on the cloud access log,
   (a) wherein a first application policy rule in the plurality of application policy rules indicates blocking cloud applications that belong to a category of cloud applications, and wherein the application policy rule is enforced by determining a category of the first cloud application and blocking the network traffic stream in response to determining that the first cloud application belongs to the category of cloud applications,
   (b) wherein a second application policy rule in the plurality of application policy rules indicates which user can access which cloud application, and wherein the application policy rule is enforced by determining a user of the first cloud application and blocking the network traffic stream in response to determining that the user is not authorized to access the first cloud application, and
   (c) wherein the cloud application server is in a blacklist, and wherein the application policy rule is enforced by blocking the network traffic stream in accordance with the blacklist.

6. The system of claim 5, further comprising:
   a key server that provides an encryption key to the cloud security server over the Internet when the application policy rule dictates encrypting data to be received by the first cloud application.

7. The system of claim 5, further comprising:
   an application reputation server that provides over the Internet reputation information of the first cloud application.

8. The system of claim 5, further comprising:
   a cloud access controller that receives the cloud access report and forwards to the cloud security server another application policy that is based on the cloud access report, wherein the cloud access controller belongs to the private computer network.

* * * * *